(12) United States Patent
Yamada

(10) Patent No.: US 10,029,461 B2
(45) Date of Patent: Jul. 24, 2018

(54) INK DISCHARGING APPARATUS AND INK DISCHARGING METHOD

(71) Applicant: Hiroaki Yamada, Chiba (JP)

(72) Inventor: Hiroaki Yamada, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/419,162

(22) Filed: Jan. 30, 2017

(65) Prior Publication Data

US 2017/0217181 A1    Aug. 3, 2017

(30) Foreign Application Priority Data

Feb. 2, 2016  (JP) ................... 2016-018252
Nov. 9, 2016  (JP) ................... 2016-219139

(51) Int. Cl.
*B41J 2/14* (2006.01)
*C09D 11/101* (2014.01)
(Continued)

(52) U.S. Cl.
CPC ......... *B41J 2/14233* (2013.01); *B29C 64/112* (2017.08); *B33Y 10/00* (2014.12);
(Continued)

(58) Field of Classification Search
CPC .. B41J 2/14233; B41J 2/14274; B41J 2/1433; B41J 2/14; B41J 11/00; B29C 64/112;
(Continued)

(56) References Cited

U.S. PATENT DOCUMENTS

2003/0189619 A1  10/2003 Shino et al.
2009/0115833 A1   5/2009 Soulliaert et al.
(Continued)

FOREIGN PATENT DOCUMENTS

EP    2 036 734 A1   3/2009
JP    10-193602 A    7/1998
(Continued)

OTHER PUBLICATIONS

U.S. Appl. No. 15/202,858, filed Jul. 6, 2016.
(Continued)

*Primary Examiner* — Geoffrey Mruk
(74) *Attorney, Agent, or Firm* — Oblon, McClelland, Maier & Neustadt, L.L.P.

(57) ABSTRACT

Provided is an ink discharging apparatus configured to discharge an active-energy-ray-curable ink from an ink discharging head of which members to contact the ink are joined using an epoxy adhesive, wherein the ink contains at least any one selected from the group consisting of an acrylamide compound and an N-vinyl compound, and wherein an elastic modulus decreasing rate represented by a formula (1) below is 50 percent or less, Elastic modulus decreasing rate (%)= $\{(E_1-E_2)/E_1\} \times 100$    formula (1)

where $E_1$ represents an elastic modulus (GPa) of a cured product obtained by curing the epoxy adhesive at 90 degrees C. for 4 hours, and $E_2$ represents an elastic modulus (GPa) of an immersed product obtained by immersing the cured product in the ink at 60 degrees C. for 4 weeks.

15 Claims, 10 Drawing Sheets

(51) Int. Cl.
  *C09D 11/30* (2014.01)
  *C09J 163/00* (2006.01)
  *B33Y 10/00* (2015.01)
  *B33Y 30/00* (2015.01)
  *B29C 64/112* (2017.01)

(52) U.S. Cl.
  CPC ............ *B33Y 30/00* (2014.12); *B41J 2/1433* (2013.01); *B41J 2/14274* (2013.01); *C09D 11/101* (2013.01); *C09D 11/30* (2013.01); *C09J 163/00* (2013.01); *B41J 2/14* (2013.01)

(58) Field of Classification Search
  CPC ........ B33Y 30/00; B33Y 10/00; C09J 163/00; C09D 11/101; C09D 11/30
  See application file for complete search history.

(56) References Cited

U.S. PATENT DOCUMENTS

| | | |
|---|---|---|
| 2013/0321520 A1 | 12/2013 | Ito et al. |
| 2014/0292930 A1 | 10/2014 | Zuo et al. |
| 2015/0009265 A1 | 1/2015 | Kohzuki et al. |
| 2015/0077481 A1 | 3/2015 | Yoshino et al. |
| 2015/0130878 A1 | 5/2015 | Kohzuki et al. |
| 2015/0232675 A1 | 8/2015 | Yoshino et al. |
| 2016/0009931 A1 | 1/2016 | Kohzuki et al. |
| 2016/0075895 A1 | 3/2016 | Kohzuki et al. |
| 2016/0326387 A1 | 11/2016 | Arita et al. |
| 2016/0347961 A1 | 12/2016 | Kobayashi et al. |

FOREIGN PATENT DOCUMENTS

| | | | |
|---|---|---|---|
| JP | 3236669 B2 | 12/2001 | |
| JP | 2002-302591 | 10/2002 | |
| JP | 2006-257350 | 9/2006 | |
| JP | 2008-149649 A | 7/2008 | |
| JP | 2013-006404 | 1/2013 | |
| JP | 2013-018853 | 1/2013 | |
| JP | WO 2015/178010 A1 * | 11/2015 | ................ B41J 2/14 |

OTHER PUBLICATIONS

Partial Search Report dated Aug. 18, 2017 in European Patent Application No. 17153971.1.

Extended European Search Report dated Dec. 4, 2017 in Patent Application No. 17153971.1; citing references AA, AO, and AP therein; 9 pages.

* cited by examiner

INK DISCHARGING APPARATUS AND INK DISCHARGING METHOD

CROSS-REFERENCE TO RELATED APPLICATIONS

The present application claims priority under 35 U.S.C. § 119 to Japanese Patent Application No. 2016-018252, filed Feb. 2, 2016 and Japanese Patent Application No. 2016-219139, filed Nov. 9, 2016. The contents of which are incorporated herein by reference in their entirety.

BACKGROUND OF THE INVENTION

Field of the Invention

The present disclosure relates to an ink discharging apparatus and an ink discharging method.

Description of the Related Art

Radical polymerizable inks and cation polymerizable inks are used in active energy ray curing inkjet recording methods. Among these inks, radical polymerizable inks are widely used from the viewpoints of production costs and storage stability of the inks.

It is known that radical polymerizable inks of the active-energy-ray-curable type contain acrylic acid esters that can suppress the viscosity of the inks and are curable with a small amount of light. It is also known that acrylamide compounds and N-vinyl compounds are used in combination with the acrylic acid esters in the radical polymerizable inks because these compounds can improve curability and close adhesiveness of cured films with bases and can raise the glass transition temperature.

In terms of, for example, curability, viscosity, and compatibility with other components, preferable examples of the acrylamide compounds and the N-vinyl compounds are compounds having a solubility parameter of around 11 $(cal/cm^3)^{1/2}$ and a low molar volume.

However, there is a problem that the active-energy-ray-curable inkjet inks decrease the elastic modulus of cured products of epoxy adhesives used for assembling ink discharging apparatuses, to degrade discharging stability of the inks.

Hence, there is proposed an ink discharging head in which an epoxy adhesive having a high solvent resistance and curable at a low temperature is used (see, e.g., Japanese Unexamined Patent Application Publication No. 2006-257350).

There is also proposed an ultraviolet-ray-curable inkjet ink composition excellent in ink discharging head durability and discharging reliability (see, e.g., Japanese Unexamined Patent Application Publication No. 2013-018853).

SUMMARY OF THE INVENTION

According to one aspect of the present disclosure, an ink discharging apparatus includes an active-energy-ray-curable ink and an ink discharging head. The ink discharging head includes liquid chambers, a nozzle plate including nozzle holes, and a flow path. Members of the ink discharging head to contact the active-energy-ray-curable ink are joined using an epoxy adhesive. The ink discharging head is configured to discharge the active-energy-ray-curable ink from the nozzle holes. The active-energy-ray-curable ink contains at least any one selected from the group consisting of an acrylamide compound and an N-vinyl compound. An elastic modulus decreasing rate represented by a formula (1) below is 50 percent or less.

$$\text{Elastic modulus decreasing rate (\%)} = \{(E_1 - E_2)/E_1\} \times 100 \quad \text{formula (1)}$$

$E_1$ represents an elastic modulus (GPa) of a cured product obtained by curing the epoxy adhesive at 90 degrees C. for 4 hours. $E_2$ represents an elastic modulus (GPa) of an immersed product obtained by immersing the cured product in the active-energy-ray-curable ink at 60 degrees C. for 4 weeks.

Figure 1:
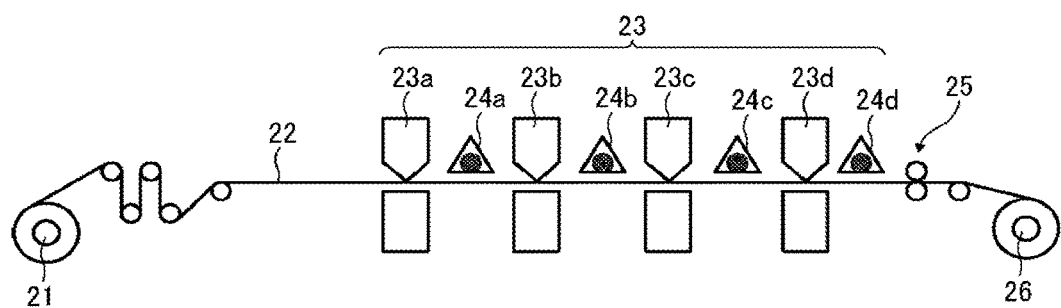
FIG. 1 is a schematic view illustrating an example of an image forming apparatus of the present disclosure.

DESCRIPTION OF THE EMBODIMENTS (Ink Discharging Apparatus and Ink Discharging Method)

An ink discharging apparatus of the present disclosure is an ink discharging apparatus including an active-energy-raycurable ink and an ink discharging head. The ink discharging head includes liquid chambers, a nozzle plate including nozzle holes, and a flow path. Members of the ink discharging head to contact the active-energy-ray-curable ink are joined using an epoxy adhesive. The ink discharging head is configured to discharge the active-energy-ray-curable ink from the nozzle holes. The active-energy-ray-curable ink contains at least any one selected from the group consisting of an acrylamide compound and an N-vinyl compound. An elastic modulus decreasing rate represented by a formula (1) below is 50 percent or less. The ink discharging apparatus further includes other members as needed.

$$\text{Elastic modulus decreasing rate (\%)} = \{(E_1 - E_2)/E_1\} \times 100 \quad \text{formula (1)}$$

$E_1$ represents an elastic modulus (GPa) of a cured product obtained by curing the epoxy adhesive at 90 degrees C. for 4 hours. $E_2$ represents an elastic modulus (GPa) of an immersed product obtained by immersing the cured product in the active-energy-ray-curable ink at 60 degrees C. for 4 weeks.

The ink discharging apparatus of the present disclosure is based on a finding that ink discharging heads that are joined using existing epoxy adhesives have problems that the elastic modulus of cured products of the epoxy adhesives used for joining decreases when inks contain acrylamide compounds or N-vinyl compounds of which solubility parameter and molar volume are in specific ranges.

The present disclosure has an object to provide an ink discharging apparatus in which a cured product of an epoxy adhesive used for joining the members of the ink discharging apparatus to contact an active-energy-ray-curable ink is suppressed from elastic modulus decreasing, so the ink discharging apparatus has an excellent discharging stability.

The present disclosure can provide an ink discharging apparatus in which a cured product of an epoxy adhesive used for joining the members of the ink discharging apparatus to contact an active-energy-ray-curable ink is suppressed from elastic modulus decreasing, so the ink discharging apparatus has an excellent discharging stability.

An ink discharging method of the present disclosure forms an image using the ink discharging apparatus of the present disclosure.

The ink discharging method of the present disclosure can be performed favorably by the ink discharging apparatus of the present disclosure.

<Ink Discharging Head>

The ink discharging head includes liquid chambers, a nozzle plate including nozzle holes, and a flow path. Members of the ink discharging head to contact an active-energy-ray-curable ink are joined using an epoxy adhesive. The liquid chambers refer to spaces that are inside the ink discharging head and are filled with an ink. The shape of the liquid chambers is not particularly limited and may be appropriately selected from known shapes depending on the intended purpose.

The nozzle plate is not particularly limited so long as the nozzle plate include nozzle holes, and a known nozzle plate may be appropriately selected depending on the intended purpose. The nozzle holes refer to holes through which liquid droplets of the ink are discharged.

The flow path refers to the liquid chambers and a path along which the active-energy-ray-curable ink to pass through the nozzle plate flows.

When it is said that the members to contact the active-energy-ray-curable ink are joined using an epoxy resin, it is meant that the ink discharging head is formed by joining the members to constitute the liquid chambers, the members to constitute the nozzle plate, and the members to constitute the flow path at at least one position using an epoxy adhesive. The present disclosure is particularly suitable when joined portions of the nozzle plate and a stimulus generating unit described below and members to be located between the nozzle plate and the stimulus generating unit (e.g., a flow path plate and a vibration plate described below) are joined using an epoxy adhesive and the joined portions contact the active-energy-ray-curable ink.

The joining is not particularly limited and may be appropriately selected depending on the intended purpose, so long as the joining is via the epoxy adhesive. In the joining, it is preferable to apply a pressure in order to improve the joining strength.

The members to contact the active-energy-ray-curable ink are not particularly limited and may be appropriately selected depending on the intended purpose, so long as the members contact the active-energy-ray-curable ink. Examples of the members include the members constituting the liquid chambers, the members constituting the nozzle plate, the members constituting the flow path, and the members constituting the stimulus generating unit.

—Nozzle Plate—

The nozzle plate includes a nozzle substrate and an ink-repellent film on the nozzle substrate.

——Nozzle Substrate——

The nozzle substrate includes nozzle holes. The number, shape, size, material, and structure of the nozzle holes are not particularly limited and may be appropriately selected depending on the intended purpose.

The nozzle substrate has a nozzle surface at an ink discharging side to which the ink is discharged through the nozzle holes, and a liquid chamber-joined surface positioned oppositely to the surface at the ink discharging side.

The ink-repellent film is formed on the nozzle surface of the nozzle substrate at the ink discharging side.

The planar shape of the nozzle substrate is not particularly limited and may be appropriately selected depending on the intended purpose. Examples of the planar shape of the nozzle substrate include a rectangular shape, a square shape, a rhomboidal shape, a circular shape, and an ellipsoidal shape. Examples of the cross-sectional shape of the nozzle substrate include a flat panel shape and a plate shape.

The size of the nozzle substrate is not particularly limited and may be appropriately selected depending on the size of the nozzle plate.

The material of the nozzle substrate is not particularly limited and may be appropriately selected depending on the intended purpose. Examples of the material of the nozzle substrate include stainless steel, Al, Bi, Cr, InSn, ITO, Nb, $Nb_2O_5$, NiCr, Si, $SiO_2$, Sn, $Ta_2O_5$, Ti, W, ZAO (ZnO+$Al_2O_3$), and Zn. One of these materials may be used alone or two or more of these materials may be used in combination. Among these materials, stainless steel is preferable in terms of corrosion resistance.

——Nozzle Holes——

For example, the number, arrangement, interval, opening shape, opening size, and cross-sectional opening shape of the nozzle holes are not particularly limited and may be appropriately selected depending on the intended purpose.

The arrangement of the nozzle holes is not particularly limited and may be appropriately selected depending on the intended purpose. Examples of the arrangement of the nozzle holes include an arrangement in which the plurality of nozzle holes are arranged side by side at equal intervals along the longer direction of the nozzle substrate.

The arrangement of the nozzle holes may be appropriately selected depending on the kind of the ink to be discharged. However, it is preferable that the arrangement include from 1 line through a plurality of lines of nozzle holes and more preferably from 1 line through 4 lines of nozzle holes.

The number of nozzle holes per line is not particularly limited and may be appropriately selected depending on the intended purpose. However, the number of nozzle holes per line is preferably from 10 through 10,000 and more preferably from 50 through 500.

The interval (pitch) P, which is the shortest distance between the centers of adjoining ones of the nozzle holes, is not particularly limited and may be appropriately selected depending on the intended purpose. However, the pitch P is preferably from 21 µm through 169 µm.

The opening shape of the nozzle holes is not particularly limited and may be appropriately selected depending on the intended purpose. Examples of the opening shape of the nozzle holes include a circular shape, an ellipsoidal shape, and a quadrangular shape. Among these shapes, a circular shape is preferable for discharging liquid droplets of an ink.

——Ink-Repellent Film——

The ink-repellent film is formed on the nozzle surface of the nozzle substrate at the ink discharging side at which the nozzle substrate has the plurality of depressions. For example, the shape, structure, material, and thickness of the ink-repellent film are not particularly limited and may be appropriately selected depending on the intended purpose.

The material of the ink-repellent film is not particularly limited and may be appropriately selected depending on the intended purpose. Examples of the material of the ink-repellent film excellent in repellency against the ink include silicone resins and perfluoro polyether compounds.

—Liquid Chambers—

The liquid chambers are a plurality of individual flow paths that are disposed in one-to-one correspondence to the plurality of nozzle holes formed in the nozzle plate and communicate with the nozzle holes. The liquid chambers may also be referred to as pressurizing liquid chambers, pressure chambers, discharging chambers, and pressurizing chambers.

—Other Members—

The other members are not particularly limited and may be appropriately selected depending on the intended purpose. Examples of the other members include a stimulus generating unit.

——Stimulus Generating Unit——

The stimulus generating unit is a unit configured to generate a stimulus to be applied to the active-energy-ray-curable ink.

The stimulus of the stimulus generating unit is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

Examples of the stimulus generating unit include heating devices, pressure devices, piezoelectric elements, vibration generating devices, ultrasonic oscillators, and lights. Specific examples of the stimulus generating unit include: a piezoelectric actuator such as a piezoelectric element; a thermal actuator that uses a thermoelectric transducer such as a heat element and utilizes phase change caused by film boiling of an ink; a shape memory alloy actuator that utilizes a metal phase change caused by a temperature change; and an electrostatic actuator that utilizes electrostatic force.

When the stimulus is "heat", there is a method using, for example, a thermal head for applying a thermal energy corresponding to a printing signal to the ink in the ink discharging head to generate bubbles in the ink by the thermal energy and discharge the ink from the nozzle holes of the nozzle plate in a form of liquid droplets by a pressure of the bubbles.

When the stimulus is "pressure", there is a method for, for example, applying a voltage to a piezoelectric element bonded to a position called a pressure chamber present in a flow path in the ink discharging head to flex the piezoelectric element and shrink the capacity of the pressure chamber to discharge the ink from the nozzle holes of the ink discharging head in a form of liquid droplets.

Of these methods, the piezo method for applying a voltage to the piezo element to discharge the ink is preferable.

Figure 4:
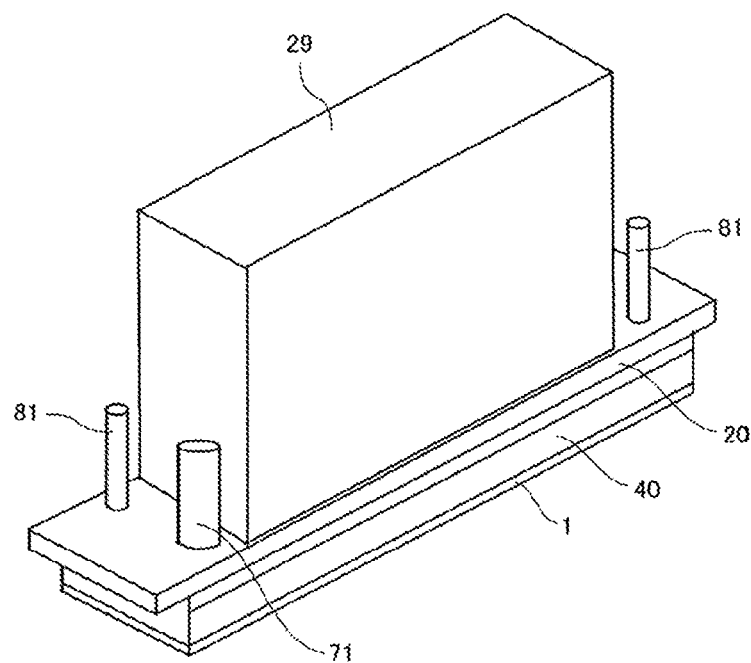
FIG. 4 is a perspective view of an appearance of a head, illustrating an example of an ink discharging head of the present disclosure.
Figure 5:
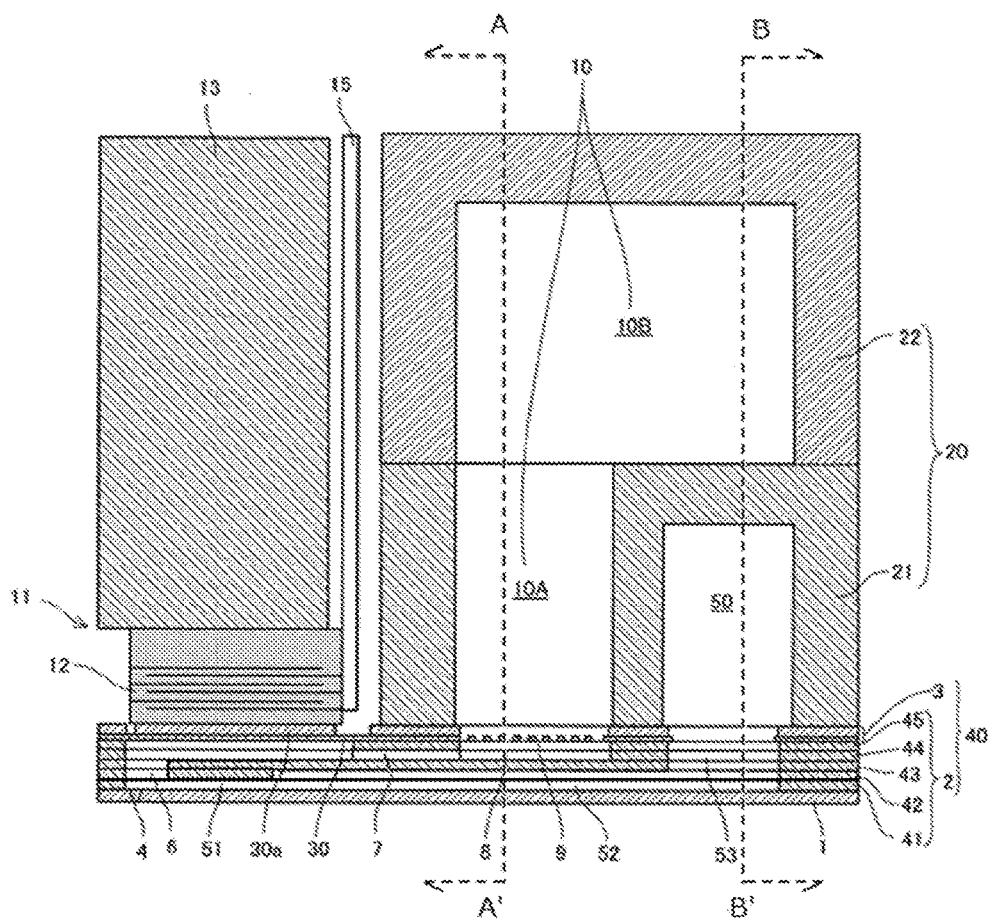
FIG. 5 is a cross-sectional view illustrating the example of the ink discharging head illustrated in FIG. 4, taken in a direction perpendicular to a nozzle arrangement direction.
Figure 6:
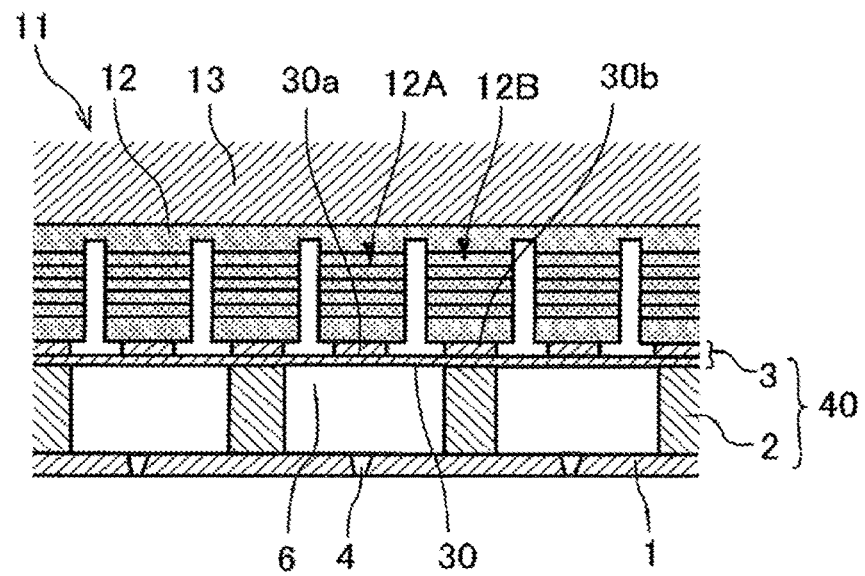
FIG. 6 is a cross-sectional view illustrating the example of the ink discharging head illustrated in FIG. 4, taken in a direction parallel with the nozzle arrangement direction.
Figure 7:
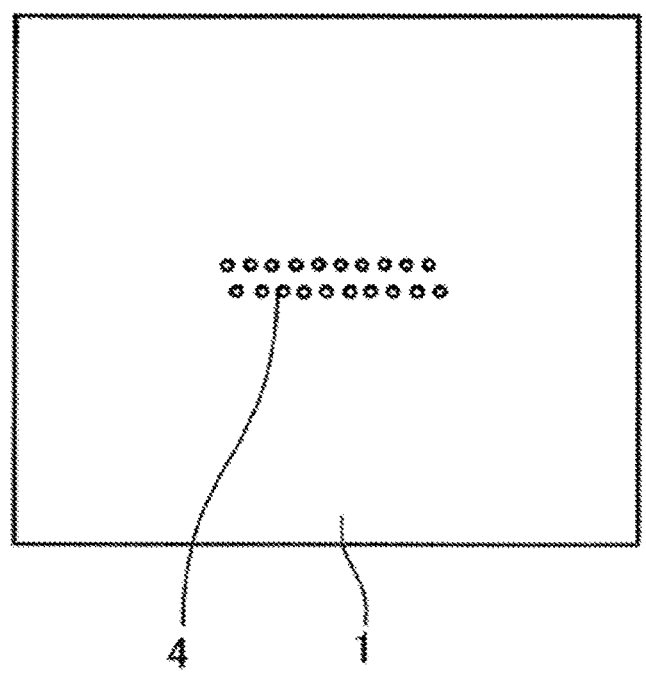
FIG. 7 is a plan view of a nozzle plate, illustrating the example of the ink discharging head illustrated in FIG. 4.

Next, an example of the ink discharging head of the present disclosure will be described with reference to FIG. 4 to FIG. 9B. FIG. 4 is a perspective view of an appearance of a head, illustrating an example of the ink discharging head of the present disclosure. FIG. 5 is a cross-sectional view illustrating the example of the ink discharging head illustrated in FIG. 4, taken in a direction perpendicular to a nozzle arrangement direction. FIG. 6 is a cross-sectional view illustrating the example of the ink discharging head illustrated in FIG. 4, taken in a direction parallel with the nozzle arrangement direction. FIG. 7 is a plan view of a nozzle plate, illustrating the example of the ink discharging head illustrated in FIG. 4. FIGS. 8A to 8F are plan views of members constituting a flow path member, illustrating the example of the ink discharging head illustrated in FIG. 4. FIGS. 9A and 9B are plan views of members constituting a common liquid chamber member of the head, illustrating the example of the ink discharging head illustrated in FIG. 4.

The liquid mentioned below has the same meaning as the ink.

This liquid discharging head is formed by laminating and joining a nozzle plate 1, a flow path plate 2, and a vibration plate member 3 serving as a wall surface member. Moreover, the liquid discharging head also includes a piezoelectric actuator 11 configured to displace the vibration plate member 3, a common liquid chamber member 20, and a cover 29.

The nozzle plate 1 includes a plurality of nozzles 4 configured to discharge liquid.

The flow path plate 2 is formed of an individual liquid chamber 6 leading to nozzles 4, a fluid resistor section 7 leading to the individual liquid chamber 6, and a liquid introducing section 8 leading to the fluid resistor section 7. Moreover, the flow path plate 2 is formed of a plurality of plate-like members 41 to 45, which are laminated/joined in this order from a side of the nozzle plate 1. The plurality of plate-like members 41 to 45 and the vibration plate member 3 are laminated/joined to constitute a flow path member 40.

The vibration plate member 3 includes a filter part 9, which serves as an opening leading the liquid introducing section 8 to a common liquid chamber 10 formed of the common liquid chamber member 20.

The vibration plate member 3 is a wall surface member that forms a wall surface of the individual liquid chamber 6 of the flow path plate 2. A structure of the vibration plate member 3 is a two-layer structure, but is not limited thereto. The vibration plate member 3 includes a first layer forming a thin part and a second layer forming a thick part, where the first layer and the second layer are laminated in this order from a side of the flow path plate 2. A vibration region 30 that is deformable is provided at a part of the first layer, the part corresponding to the individual liquid chamber 6.

Here, as presented in FIG. 7, a plurality of nozzles 4 are arranged in a zigzag manner on the nozzle plate 1.

Figure 8A:
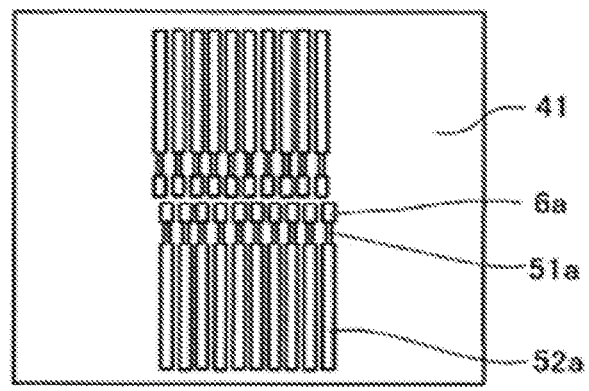
FIG. 8A is a plan view of members constituting a flow path member, illustrating the example of the ink discharging head illustrated in FIG. 4.
Figure 9A:
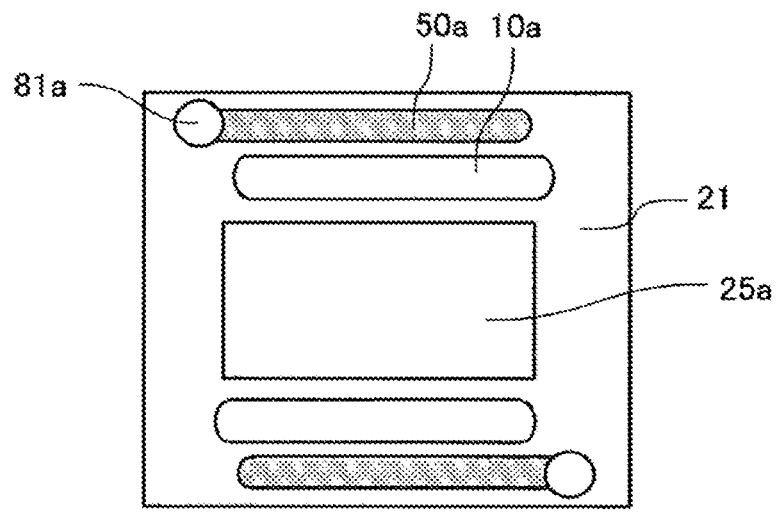
FIG. 9A is a plan view of members constituting a common liquid chamber member of the head, illustrating the example of the ink discharging head illustrated in FIG. 4.
Figure 9B:
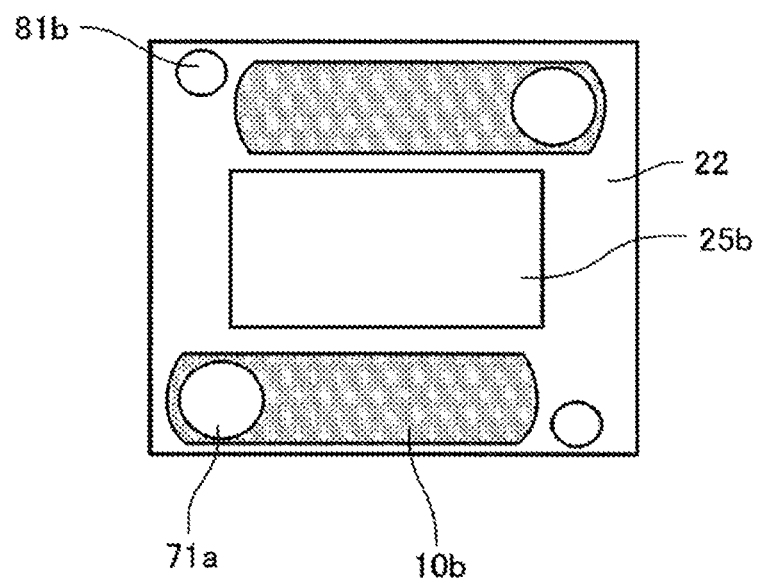
FIG. 9B is a plan view of members constituting the common liquid chamber member of the head, illustrating the example of the ink discharging head illustrated in FIG. 4.

As presented in FIG. 8A, the plate-like member 41 constituting the flow path plate 2 includes: a penetrated groove (which means a groove-shaped penetrated hole) 6a constituting the individual liquid chamber 6; a penetrated groove 51a constituting a fluid resistor section 51; and a penetrated groove 52a constituting a circulation flow path 52.

Figure 8B:
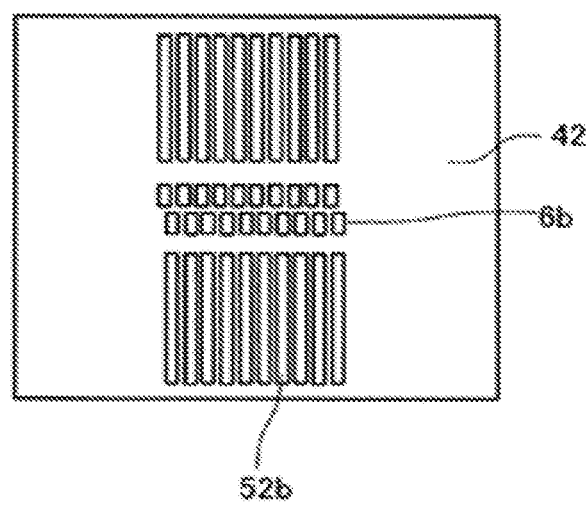
FIG. 8B is a plan view of members constituting the flow path member, illustrating the example of the ink discharging head illustrated in FIG. 4.

Similarly, the plate-like member 42, as illustrated in FIG. 8B, includes: a penetrated groove 6b constituting the individual liquid chamber 6; and a penetrated groove 52b constituting the circulation flow path 52.

Figure 8C:
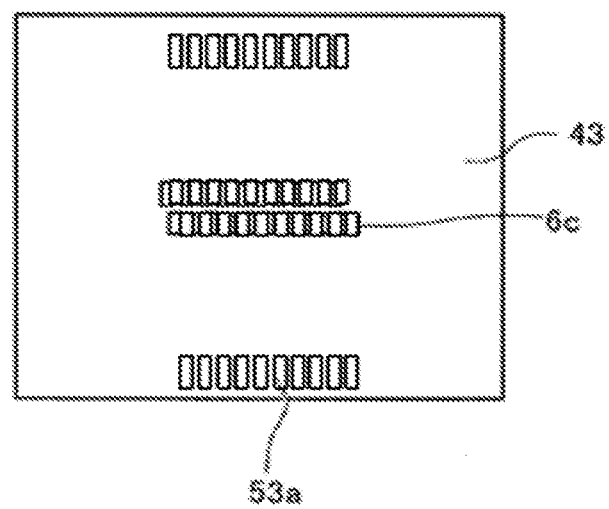
FIG. 8C is a plan view of members constituting the flow path member, illustrating the example of the ink discharging head illustrated in FIG. 4.

Similarly, the plate-like member 43, as presented in FIG. 8C, includes: a penetrated groove 6c constituting the individual liquid chamber 6; and a penetrated groove 53a constituting a circulation flow path 53 and having a nozzle arrangement direction as a longitudinal direction.

Figure 8D:
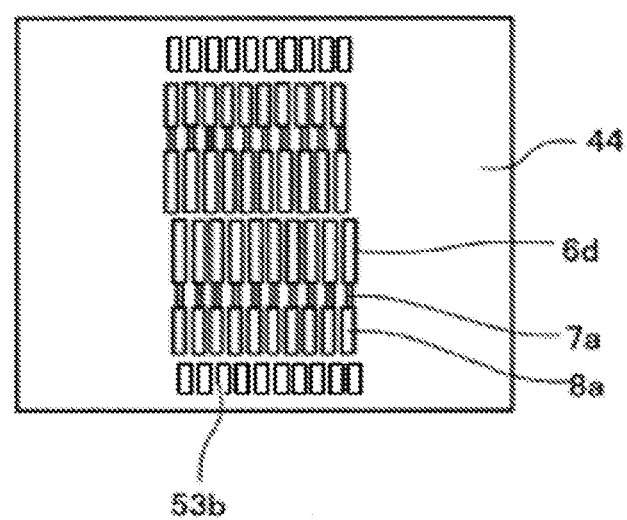
FIG. 8D is a plan view of members constituting the flow path member, illustrating the example of the ink discharging head illustrated in FIG. 4.

Similarly, the plate-like member 44, as presented in FIG. 8D, includes: a penetrated groove 6d constituting the individual liquid chamber 6; a penetrated groove 7a which is the fluid resistor section 7; a penetrated groove 8a constituting the liquid introducing section 8; and a penetrated groove 53b constituting the circulation flow path 53 and having a nozzle arrangement direction as a longitudinal direction.

Figure 8E:
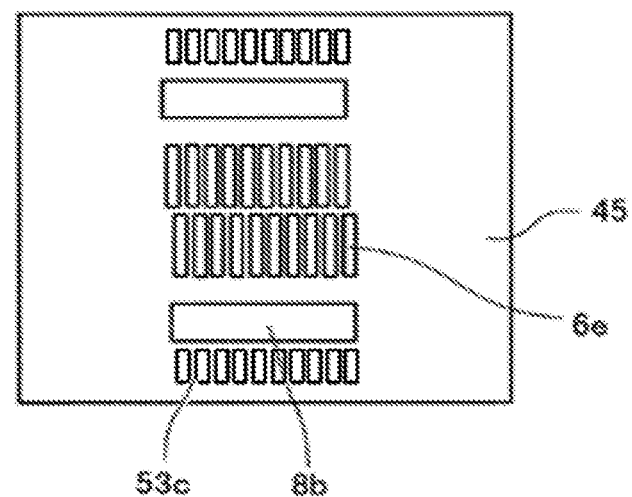
FIG. 8E is a plan view of members constituting the flow path member, illustrating the example of the ink discharging head illustrated in FIG. 4.

Similarly, the plate-like member 45, as presented in FIG. 8E, includes: a penetrated groove 6e constituting the individual liquid chamber 6; a penetrated groove 8b (which is to be a liquid chamber at a side downstream of the filter) constituting the liquid introducing section 8 and having a nozzle arrangement direction as a longitudinal direction; and a penetrated groove 53c constituting the circulation flow path 53 and having a nozzle arrangement direction as a longitudinal direction.

Figure 8F:
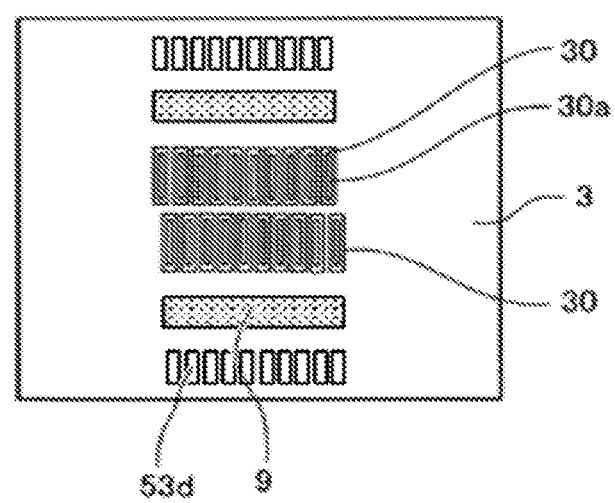
FIG. 8F is a plan view of members constituting the flow path member, illustrating the example of the ink discharging head illustrated in FIG. 4.

The vibration plate member 3, as presented in FIG. 8F, includes the vibration region 30, the filter part 9, and a penetrated groove 53d constituting the circulation flow path 53 and having a nozzle arrangement direction as a longitudinal direction.

When a plurality of plate-like members are laminated and joined in this manner, it is possible to form a complicated flow path with a simple configuration.

In the above configuration, the flow path member 40 including the flow path plate 2 and the vibration plate member 3 is provided with: the fluid resistor section 51, which is along a plane direction of the flow path plate 2 and leads to each individual liquid chamber 6; the circulation flow path 52; and the circulation flow path 53, which is along a thickness direction of the flow path member 40 and leads to the circulation flow path 52. Note that, the circulation flow path 53 leads to a circulation common liquid chamber 50 described below.

Meanwhile, the common liquid chamber member 20 is provided with: a common liquid chamber 10, to which liquid is supplied from a supplying/circulating mechanism; and the circulation common liquid chamber 50.

A first common liquid chamber member 21 constituting the common liquid chamber member 20, as presented in FIG. 9A, includes: a through hole 25a for a piezoelectric actuator; a penetrated groove 10a, which is to be a downstream-side common liquid chamber 10A; and a bottomed groove 50a, which is to be the circulation common liquid chamber 50.

Similarly, a second common liquid chamber member 22, as presented in FIG. 9B, includes: a through hole 25b for a piezoelectric actuator; and a groove 10b, which is to be an upstream-side common liquid chamber 10B.

Referring to FIG. 4 as well, the second common liquid chamber member 22 is provided with a through hole 71a, which is to be a supply port leading to a supply port 71, one end of the common liquid chamber 10 in the nozzle arrangement direction.

Similarly, the first common liquid chamber member 21 and the second common liquid chamber member 22 are respectively provided with through holes 81a and 81b leading to a circulation port 81, the other end of the circulation common liquid chamber 50 in the nozzle arrangement direction (the end at the opposite side to the through hole 71a).

Note that, in FIGS. 9A and 9B, the bottomed groves are illustrated as being painted (the same applies to the following figures).

In this manner, the common liquid chamber member 20 is formed of the first common liquid chamber member 21 and the second common liquid chamber member 22, and the first common liquid chamber member 21 is joined to the flow path member 40 at a side of the vibration plate member 3 and the second common liquid chamber member 22 is laminated on and joined to the first common liquid chamber member 21.

Here, the first common liquid chamber member 21 forms: the downstream-side common liquid chamber 10A, which is a part of the common liquid chamber 10 leading to the liquid introducing section 8; and the circulation common liquid chamber 50 leading to the circulation flow path 53. Also, the second common liquid chamber member 22 forms the upstream-side common liquid chamber 10B, which is the remaining part of the common liquid chamber 10.

Here, the downstream-side common liquid chamber 10A, which is a part of the common liquid chamber 10, and the circulation common liquid chamber 50 are arranged side by side in a direction perpendicular to the nozzle arrangement direction. The circulation common liquid chamber 50 is arranged at such a position that the circulation common liquid chamber 50 is projected within the common liquid chamber 10.

With this configuration, the dimension of the circulation common liquid chamber 50 does not receive any restriction due to the dimension necessary for the flow path formed by the flow path member 40 and including the individual liquid chamber 6, the fluid resistor section 7, and the liquid introducing section 8.

When the circulation common liquid chamber 50 and a part of the common liquid chamber 10 are arranged side by side and the circulation common liquid chamber 50 is arranged at such a position that the circulation common liquid chamber 50 is projected within the common liquid chamber 10, it is possible to control the width of the head in the direction perpendicular to the nozzle arrangement direction, to suppress enlargement of the head. The common liquid chamber member 20 forms the common liquid chamber 10, to which liquid is supplied from a head tank and a liquid cartridge, and the circulation common liquid chamber 50.

Meanwhile, at a side of the vibration plate member 3 opposite to the individual liquid chamber 6, a piezoelectric actuator 11 including an electromechanical transducer is disposed, the piezoelectric actuator 11 serving as a driving unit configured to deform the vibration region 30 of the vibration plate member 3.

This piezoelectric actuator 11, as presented in FIG. 6, includes a piezoelectric member 12 joined onto a base member 13. The piezoelectric member 12 is processed by half-cut dicing so as to have grooves, to form a required number of columnar piezoelectric elements 12A and 12B at predetermined intervals in a comb shape per one piezoelectric member 12.

Here, the piezoelectric element 12A of the piezoelectric member 12 is a piezoelectric element configured to be driven by application of a driving waveform, and the piezoelectric element 12B is used only as a fulcrum without application of a driving waveform. However, all of the piezoelectric elements 12A and 12B may be used as piezoelectric elements configured to be driven.

The piezoelectric element 12A is joined to a convex portion 30a, which is an island-like thick portion formed on the vibration region 30 of the vibration plate member 3. The piezoelectric element 12B is joined to a convex portion 30b, which is a thick portion of the vibration plate member 3.

This piezoelectric member 12 is a laminate where piezoelectric layers and inner electrodes are alternatingly laminated. Each of the inner electrodes is drawn to the end surface to provide an external electrode. A flexible wiring member 15 is coupled to the external electrode.

In the liquid discharging head formed in this manner, for example, by decreasing voltage applied to the piezoelectric element 12A from reference voltage, the piezoelectric element 12A shrinks and the vibration region 30 of the vibration plate member 3 descends. As a result, the volume of the individual liquid chamber 6 increases and liquid flows into the individual liquid chamber 6.

After that, by increasing voltage applied to the piezoelectric element 12A to elongate the piezoelectric element 12A in the laminated direction and deform the vibration region 30 of the vibration plate member 3 toward the nozzle 4 to decrease the volume of the individual liquid chamber 6, the liquid in the individual liquid chamber 6 is pressed and discharged from the nozzle 4.

By returning voltage applied to the piezoelectric element 12A to the reference voltage, the vibration region 30 of the vibration plate member 3 is returned to the initial position, and the individual liquid chamber 6 swells to generate a negative pressure. At this time, therefore, liquid is charged into the individual liquid chamber 6 from the common liquid chamber 10. After the vibration on the meniscus surface of the nozzle 4 attenuates and is stabilized, the status is transferred to an operation for the next event of discharging.

Note that, the driving method of this head is not limited to the above example (pull-push ejection). Depending on how to apply a driving waveform, pull ejection, push ejection, or others can be performed. Also, the above embodiment has been described using a laminated piezoelectric element as a pressure generating unit configured to apply pressure fluctuation to the individual liquid chamber 6. However, without being limited to the laminated piezoelectric element, a thin-film piezoelectric element can also be used. Another usable method is disposing a heating resistor in the individual liquid chamber 6 and applying pressure fluctuation by bubbles formed through heat generation from the heating resistor. Still another usable method is generating pressure fluctuation using electrostatic force.

The present disclosure is particularly suitably applicable when at least one of the joined portions of the nozzle plate 1, the flow path plate 2 (i.e., the plate-like members 41 to 45), and the vibration plate member 3 in the above-described example of the ink discharging head is joined using an epoxy adhesive.

Figure 10:
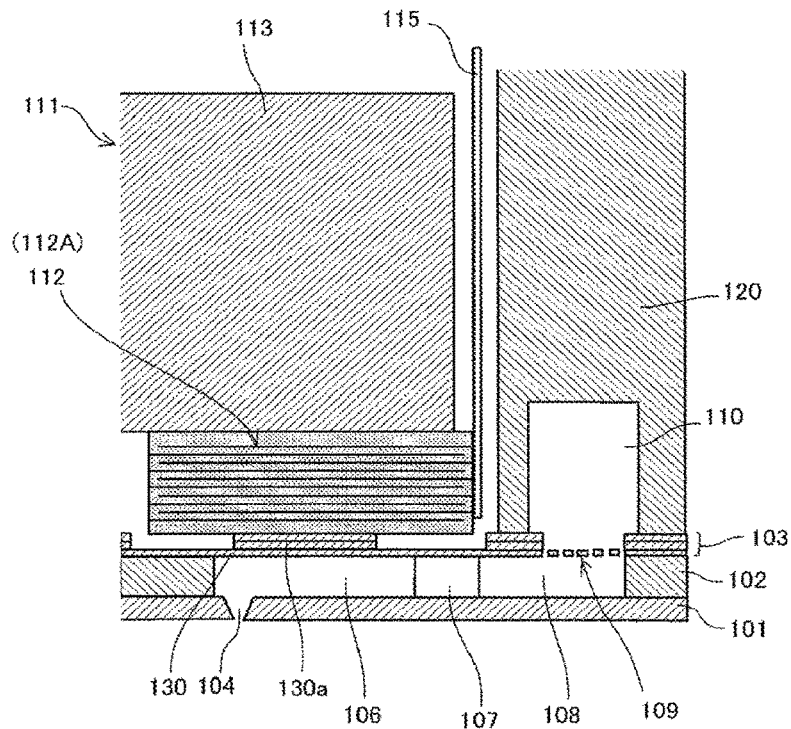
FIG. 10 is a cross-sectional view illustrating another example of an ink discharging head of the present disclosure, taken in a direction perpendicular to a nozzle arrangement direction.
Figure 11:
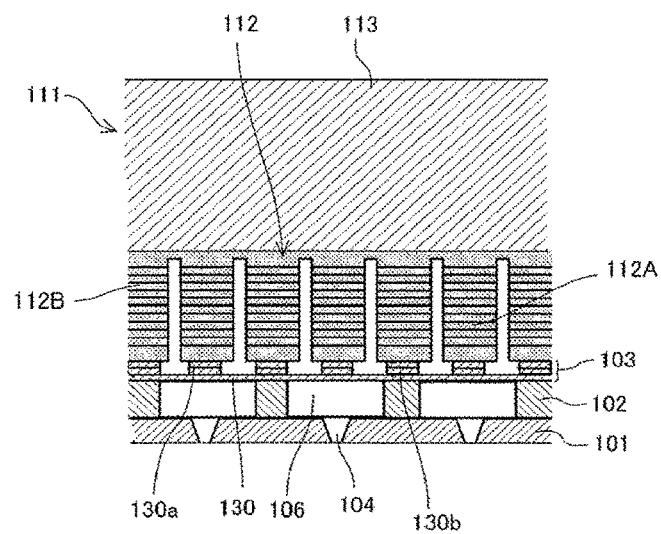
FIG. 11 is a cross-sectional view illustrating another example of an ink discharging head of the present disclosure, taken in a direction parallel with a nozzle arrangement direction.

Next, another example of the ink discharging head of the present disclosure will be described with reference to FIG. 10 and FIG. 11. FIG. 10 is a cross-sectional view illustrating another example of the ink discharging head of the present disclosure, taken in a direction perpendicular to a nozzle arrangement direction. FIG. 11 is a cross-sectional view illustrating another example of the ink discharging head of the present disclosure, taken in a direction parallel with the nozzle arrangement direction.

The liquid mentioned below has the same meaning as the ink.

This liquid discharging head is formed by laminating and joining a nozzle plate 101, a flow path plate 102, and a vibration plate member 103 formed of a thin-film material and serving as a wall surface member. The liquid discharging head also includes a piezoelectric actuator 111 configured to displace the vibration plate member 103 and a frame member 120 serving as a common liquid chamber member.

The nozzle plate 101, the flow path plate 102, and the vibration plate member 103 constitute: individual liquid chambers 106 leading to a plurality of nozzles 104 from which liquid is discharged; a fluid resistor section 107 configured to supply liquid into the individual liquid chambers 106; and a liquid introducing section 108 leading to the fluid resistor section 107.

Liquid is supplied into the individual liquid chambers 106 from a common liquid chamber 110, which is a common flow path in the frame member 120, via a supply opening 109 formed in the vibration plate member 103 and through the liquid introducing section 108 an the fluid resistor section 107. A filter may be provided at the introducing opening 109.

The vibration plate member 103 is a wall surface member that forms a wall surface of the individual liquid chamber 106 of the flow path plate 102. A structure of the vibration plate member 103 is a three-layer structure. A vibration region (vibration plate) 130 that is deformable is provided at a part of one layer on the flow path plate 102 side, the part corresponding to the individual liquid chamber 106.

At a side of the vibration plate member 103 opposite to the individual liquid chamber 106, the piezoelectric actuator 111 including an electromechanical transducer is disposed, the piezoelectric actuator 111 serving as an actuator unit or a pressure generating unit configured to deform the vibration region 130 of the vibration plate member 103.

This piezoelectric actuator 111 includes a plurality of laminated piezoelectric members 112 joined onto a base member 113 using an adhesive. The piezoelectric members 112 are processed by half-cut dicing so as to have grooves, to form a required number of columnar piezoelectric elements (piezoelectric columns) 112A and 112B at predetermined intervals in a comb shape per one piezoelectric member 112.

The piezoelectric elements 112A and 112B of the piezoelectric member 112 are identical elements. However, the piezoelectric element 112A is configured to be driven by application of a driving waveform, and the piezoelectric element 112B is used only as a fulcrum without application of a driving waveform.

The piezoelectric element 112A is joined to a convex portion 130a, which is an island-like thick portion formed on the vibration region 130 of the vibration plate member 103. The piezoelectric element 112B is joined to a convex portion 130b, which is a thick portion of the vibration plate member 103.

This piezoelectric member 112 is a laminate where piezoelectric layers and inner electrodes are alternatingly laminated. Each of the inner electrodes is drawn to the end surface to provide an external electrode. A FPC 115, which is a flexible wiring member configured to apply a driving signal to the external electrode of the piezoelectric element 112A, is coupled to the external electrode.

The flame member 120 is formed by injection molding of, for example, an epoxy-based resin or polyphenylene sulfite, which is a thermoplastic resin. The flame member 120 forms the common liquid chamber 110, to which liquid is supplied from a head tank or a liquid cartridge.

In the liquid discharging head formed in this manner, for example, by decreasing voltage applied to the piezoelectric element 112A from reference voltage, the piezoelectric element 112A shrinks to draw the vibration region 130 of the vibration plate member 103. As a result, the volume of the individual liquid chamber 106 increases and liquid flows into the individual liquid chamber 106.

After that, by increasing voltage applied to the piezoelectric element 112A to elongate the piezoelectric element 112A in the laminated direction and deform the vibration region 130 of the vibration plate member 103 toward the nozzle 104 to decrease the volume of the individual liquid chamber 106, the liquid in the individual liquid chamber 106 is pressed and discharged (jetted) from the nozzle 104.

By returning voltage applied to the piezoelectric element 112A to the reference voltage, the vibration region 130 of the vibration plate member 103 is returned to the initial position, and the individual liquid chamber 106 swells to generate a negative pressure. At this time, therefore, liquid is charged into the individual liquid chamber 106 from the common liquid chamber 110. After the vibration on the meniscus surface of the nozzle 104 attenuates and is stabilized, the status is transferred to an operation for the next event of liquid droplet discharging.

Note that, the driving method of this head is not limited to the above example (pull-push ejection). Depending on how to apply a driving waveform, pull ejection, push ejection, or others can be performed.

The present disclosure is particularly suitably applicable when at least one of the joined portions of the nozzle plate 101, the flow path plate 102, and the vibration plate member 103 in the above-described example of the ink discharging head is joined using an epoxy adhesive.

<<Epoxy Adhesive>>

The epoxy adhesive contains an epoxy compound and a curing agent, and further contains other components as needed. The epoxy adhesive also encompasses epoxy-based adhesives containing an epoxy compound as a main component.

[Elastic Modulus of Cured Product]

A cured product obtained by curing the epoxy adhesive at 90 degrees C. for 4 hours is assumed to have an elastic modulus $E_1$ (GPa), and an immersed product obtained by immersing the cured product in the active-energy-ray-curable ink at 60 degrees C. for 4 weeks is assumed to have an elastic modulus $E_2$ (GPa). In this case, an elastic modulus decreasing rate represented by a formula (1) below is 50 percent or less and preferably 10 percent or less. When the elastic modulus decreasing rate is 50 percent or less, it is possible to prevent degradation of discharging stability due to elastic modulus decreasing.

Elastic modulus decreasing rate (%)=$\{(E_1-E_2)/E_1\} \times 100$      formula (1)

The elastic modulus $E_1$ of the cured product is preferably 3.5 GPa or greater and more preferably 4.0 GPa or greater. When the elastic modulus $E_1$ of the cured product is 3.5 GPa or greater, the flow path has a high stiffness. This makes it possible to increase discharging stability of the ink.

[Martens Hardness of Cured Product]

The cured product obtained by curing the epoxy adhesive at 90 degrees C. for 4 hours is assumed to have a Martens hardness $M_1$ (N/mm$^2$). The immersed product obtained by immersing the cured product in the active-energy-ray-curable ink at 60 degrees C. for 4 weeks is assumed to have a Martens hardness $M_2$ (N/mm$^2$). In this case, a Martens hardness decreasing rate represented by a formula (2) below is 50 percent or less and preferably 10 percent or less. When the Martens hardness decreasing rate is 50 percent or less, it is possible to prevent degradation of discharging stability clue to Martens hardness decreasing.

Martens hardness decreasing rate (%)= $\{(M_1-M_2)/M_1\} \times 100$      formula (2)

The Martens hardness $M_1$ of the cured product is preferably 180 N/mm$^2$ or greater and more preferably 200 N/mm$^2$ or greater. When the Martens hardness $M_1$ of the cured product is 180 N/mm$^2$ or greater, the flow path has a high stiffness. This makes it possible to increase discharging stability of the ink.

For example, with a micro hardness tester (instrument name: FISCHER SCOPE HM2000 available from Fischer Instruments K.K.), the elastic modulus and the Martens hardness can be measured by indenting a Vickers indenter. Note that the elastic modulus can be obtained with reference to indentation elastic modulus "$E_{IT}/(1-v_s^2)$", and the Martens hardness can be obtained with reference to "HM" value. The measuring conditions are a loading or unloading rate of 5 mN/10 seconds and creeping of 5 seconds.

The content of epoxy group in the epoxy adhesive before cured is preferably 0.4 mol/100 g or greater and more preferably 0.5 mol/100 g or greater. When the content of epoxy group in the epoxy adhesive before cured is 0.4 mol/100 g or greater, the epoxy adhesive after cured (cured product) can be prevented from decreasing of the elastic modulus and Martens hardness, even when the cured product contacts an active-energy-ray-curable ink in which components that tend to decrease the elastic modulus and Martens hardness of the cured product, such as an acrylamide compound and an N-vinyl compound of which solubility parameter and molar volume are in specific ranges, account for 30 percent by mass or greater of the ink.

The content of epoxy group in the epoxy adhesive can be calculated according to a formula (3) below, where epoxy equivalents of respective epoxy compounds contained in the epoxy adhesive are represented by $Q_1, Q_2, \ldots,$ and $Q_x$ (g/mol), and mass percentages of the respective epoxy compounds in the epoxy adhesive are represented by $W_1, W_2, \ldots,$ and $W_x$ (%). The method for measuring the epoxy equivalents of the epoxy compounds is not particularly limited and may be appropriately selected depending on the intended purpose. Examples of the method include a titration method standardized by Japanese Industrial Standards (JIS) K7236.

Content of epoxy group in epoxy adhesive (mol/100 g)=$\Sigma_i(W_i/Q_i)$      formula (3)

In formula (3), $\Sigma$ represents summation and i represents an integer.

—Epoxy Compound—

The epoxy compound is not particularly limited and may be appropriately selected depending on the intended purpose. Examples of the epoxy compound include bisphenol A-type epoxy compounds, bisphenol F-type epoxy compounds, bisphenol S-type epoxy compounds, hydrogenated bisphenol A-type epoxy compounds, phenol novolac-type epoxy compounds, cresol novolac-type epoxy compounds, glycidyl ester-type epoxy compounds, glycidyl amine-type epoxy compounds, alicyclic epoxy compounds, urethane-modified epoxy compounds, polysulfide-modified epoxy compounds, rubber-modified epoxy compounds (e.g., modification by CTBN: butadiene-acrylonitrile copolymer liquid rubbers containing carboxyl groups at terminals and ATBN: butadiene-acrylonitrile copolymer liquid rubbers containing amino groups at terminals), polyalkylene glycol-type epoxy compounds, ether elastomer-added bisphenol A-type epoxy compounds, liquid urethane resin-added bisphenol A-type epoxy compounds, and dimer acid-modified epoxy compounds. One of these epoxy compounds may be used alone or two or more of these epoxy compounds may be used in combination. Among these epoxy compounds, bisphenol A-type epoxy compounds and bisphenol F-type epoxy compounds are preferable in terms of curability and adhesiveness.

Low-viscosity epoxy compounds such as n-butylglycidyl ether and styrene oxide may be used as reactive diluents for the epoxy compound.

The content of the epoxy compound is preferably 60 percent by mass or greater and more preferably 80 percent by mass or greater of the total amount of the epoxy adhesive. When the content of the epoxy compound is 60 percent by mass or greater, curability of the epoxy adhesive can be improved.

—Curing Agent—

The curing agent is not particularly limited, and a known epoxy curing agent may be appropriately selected depending on the intended purpose. Examples of the known epoxy curing agent include amine-based compounds such as aromatic amines, aliphatic amines, alicyclic amines, heterocyclic amines, dicyandiamide, hydrazide, and amine adducts, acid anhydrides, phenol compounds, thiol compounds, and imidazole compounds.

The content of the curing agent is preferably 1 percent by mass or greater but 30 percent by mass or less and more preferably 5 percent by mass or greater but 20 percent by mass or less of the total amount of the epoxy adhesive. When the content of the curing agent is 1 percent by mass or greater but 30 percent by mass or less, curability of the epoxy adhesive can be improved.

—Other Components—

Examples of the other components include curing promoters such as tertiary amine compounds and imidazole compounds, fillers such as silica, and additives such as silane coupling agents.

The conditions for curing the epoxy adhesive are not particularly limited. For example, a known curing temperature and a known curing time may be appropriately selected depending on the intended purpose.

The curing temperature is not particularly limited and may be appropriately selected depending on the intended purpose. However, the curing temperature is preferably higher than or equal to room temperature (25 degrees C.) but 200 degrees C. or lower, and more preferably 40 degrees C. or higher but 180 degrees C. or lower.

The curing time is not particularly limited and may be appropriately selected depending on the intended purpose. However, the curing time is preferably 10 minutes or longer but 48 hours or shorter and more preferably 1 hour or longer but 24 hours or shorter.

In order to increase the joining strength, it is preferable to cure the epoxy adhesive while applying a pressure to the portion at which joining targets contact each other.

<Active-Energy-Ray-Curable Ink>

The active-energy-ray-curable ink contains at least any one selected from the group consisting of an acrylamide compound and an N-vinyl compound, and further contains other components as needed.

Solubility parameters of the acrylamide compound and the N-vinyl compound calculated according to Fedors method are preferably 10.5 $(cal/cm^3)^{1/2}$ or greater but 11.5 $(cal/cm^3)^{1/2}$ or less. When the solubility parameters (SP values) of the acrylamide compound and the N-vinyl compound are 10.5 $(cal/cm^3)^{1/2}$ or greater but 11.5 $(cal/cm^3)^{1/2}$ or less, the effect of employing the ink discharging apparatus of the present disclosure is significant, because the acrylamide compound and the N-vinyl compound easily permeate the spaces between the molecules of the epoxy adhesive, and particularly have inclination toward decreasing the elastic modulus and Martens hardness of the cured product of the epoxy adhesive.

Molar volumes of the acrylamide compound and the N-vinyl compound are preferably 150 $cm^3/mol$ or less. When the molar volumes of the acrylamide compound and the N-vinyl compound are 150 $cm^3/mol$ or less, the effect of employing the ink discharging apparatus of the present disclosure is significant, because the acrylamide compound and the N-vinyl compound easily permeate the spaces between the molecules of the epoxy adhesive, and particularly have inclination toward decreasing the elastic modulus and Martens hardness of the cured product of the epoxy adhesive.

Examples of the acrylamide compound and the N-vinyl compound include acryloylmorpholine (SP value: 11.2 $(cal/cm^3)^{1/2}$, molar volume: 118.5 $cm^3/mol$), N-vinylcaprolactam (SP value: 10.8 $(cal/cm^3)^{1/2}$, molar volume: 130.8 $cm^3/mol$), and N-vinylpyrrolidone (SP value: 11.4 $(cal/cm^3)^{1/2}$, molar volume: 98.6 $cm^3/mol$). One of these compounds may be used alone or two or more of these compounds may be used in combination. Among these compounds, acryloylmorpholine and N-vinylcaprolactam are preferable.

The content of the acrylamide compound and the N-vinyl compound, expressed as the total of the acrylamide compound and the N-vinyl compound, is preferably 30 percent by mass or greater and more preferably 30 percent by mass or greater but 50 percent by mass or less of the total amount of the active-energy-ray-curable ink.

<<Other Components>>

The other components are radical polymerizable compounds other than the acrylamide compound and the N-vinyl compound.

Examples of the radical polymerizable compounds include: acrylic acid derivatives such as 2-hydroxyethyl acrylate, butoxyethyl acrylate, ethyl carbitol acrylate, cyclohexyl acrylate, tetrahydrofurfuryl acrylate, 2-(2-vinyloxyethoxy)ethyl acrylate, benzyl acrylate, 2-phenoxyethyl acrylate, isobornyl acrylate, neopentyl glycol diacrylate, ethoxylated neopentyl glycol diacrylate, propoxylated neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, propylene glycol diacrylate, dipropylene glycol diacrylate, tripropylene glycol diacrylate, tetrapropylene glycol diacrylate, polypropylene glycol diacrylate, pentaerythritol triacrylate, pentaerythritol tetraacrylate, dipentaerythritol hexaacrylate, and trimethylolpropane triacrylate; methacrylic acid derivatives such as methyl methacrylate, n-butyl methacrylate, allyl methacrylate, glycidyl methacrylate, 2-(2-vinyloxyethoxy)ethyl methacrylate, benzyl methacrylate, dimethyl aminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, and trimethylolpropane trimethacrylate; allyl compounds such as allyl glycidyl ether, diallyl phthalate, and triallyl trimellitate; and vinyl ether compounds such as diethylene glycol divinyl ether, cyclohexanedimethanol divinyl ether. One of these radical polymerizable compounds may be used alone or two or more of these radical polymerizable compounds may be used in combination.

The acrylic acid derivatives and the methacrylic acid derivatives are not particularly limited and may be appropriately selected from known oligomers and prepolymers depending on the intended purpose.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The active-energy-ray-curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium salt compounds, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
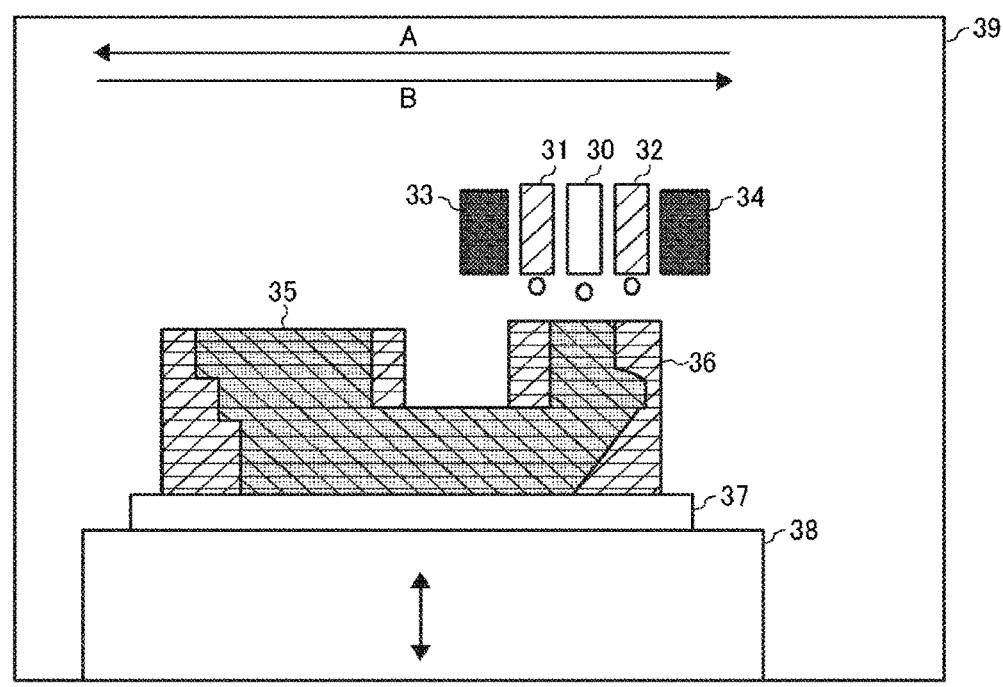
FIG. 2 is a schematic view illustrating another example of an image forming apparatus of the present disclosure.
Figure 3A:
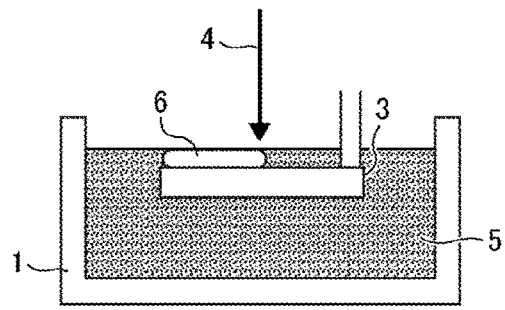
FIGS. 3A to 3D are schematic views illustrating yet another example of an image forming apparatus of the present disclosure.
Figure 3B:
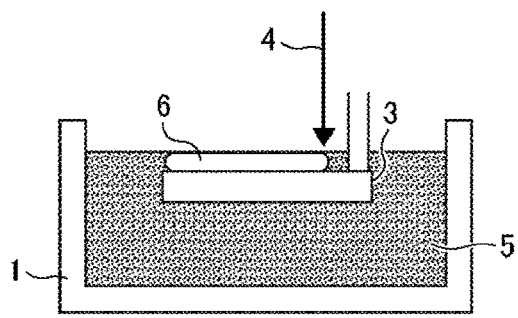
Figure 3C:
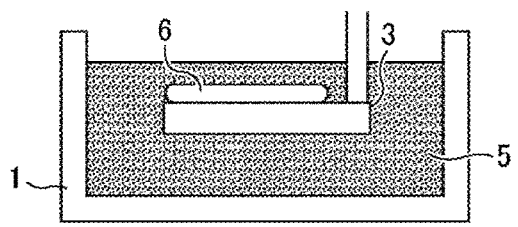
Figure 3D:
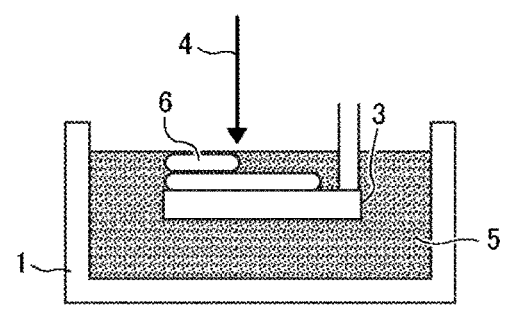

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (described in detail below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. The processed product is suitable for what is processed after surface-decorating. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

The ink discharging apparatus of the present disclosure can be used as an image forming apparatus. Examples of the image forming apparatus include an image forming apparatus configured to discharge an ink and form an image on a sheet, and a three-dimensional object forming apparatus (3D forming apparatus) configured to discharge a forming liquid onto a powder layer formed of a powder in a layer state, to form a three-dimensional object (3D object). These forming apparatuses are not limited to producing meaningful visible images such as texts and figures using the discharged liquid. These forming apparatuses may also form meaningless patterns or three-dimensional images. In these forming apparatuses, it is preferable that the active-energy-ray-curable ink be supplied into the ink discharging head from a predetermined storing container. A composition stored container, an image forming method, and an image forming apparatus will be described below.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction in a manner to match how many layers are laminated, to laminate the supporting layer and the additive manufacturing layer to fabricate a solid object 35.

Thereafter, an additive manufacturing support 36 is removed, if desired. Although only a single ejection head unit 30 for additive manufacturing is provided to the image forming apparatus 39 illustrated in FIG. 2, it can have two or more units 30.

<Image>

The image is formed using the ink discharging apparatus of the present disclosure.

The image is preferably two-dimensional or three-dimensional.

EXAMPLES

The present disclosure will be described below by way of Examples. However, the present disclosure should not be construed as being limited to the Examples.

Elastic modulus, Martens hardness, and content of epoxy group in an epoxy adhesive before cured were measured in the manners described below.

<Elastic Modulus and Martens Hardness>

With a micro hardness tester (instrument name: FISCHER SCOPE HM2000 available from Fischer Instruments K.K.), the elastic modulus and the Martens hardness were measured by indenting a Vickers indenter. Note that the elastic modulus was obtained with reference to indentation elastic modulus "$E_{IT}/(1-v_s^2)$", and the Martens hardness was obtained with reference to "HM" value. The measuring conditions were a loading or unloading rate of 5 mN/10 seconds and creeping of 5 seconds.

<Content of Epoxy Group in Epoxy Adhesive Before Cured>

The content of epoxy group in an epoxy adhesive before cured was calculated according to a formula (3) below, where epoxy equivalents of respective epoxy compounds contained in the epoxy adhesive are represented by $Q_1$, $Q_2, \ldots$, and $Q_x$ (g/mol), and mass percentages of the respective epoxy compounds in the epoxy adhesive are represented by $W_1, W_2, \ldots$, and $W_x$ (%).

Content of epoxy group in epoxy adhesive (mol/100 g)=$\Sigma_i(W_i/Q_i)$     formula (3)

In formula (3), Σ represents summation and i represents an integer.

When the epoxy equivalents were widely dispersed, the median was used for the calculation.

(Active-Energy-Ray-Curable Ink Production Example 1)
<Production of Active-Energy-Ray-Curable Ink 1>

Acryloylmorpholine (available from KJ Chemicals Corporation) (70.0 percent by mass), benzyl acrylate (available from Osaka Organic Chemical Industry Ltd.) (24.0 percent by mass), bis(2,4,6-trimethylbenzoyl)phenylphosphine oxide (available from BASF Japan Ltd.) (5.5 percent by mass), 2,4-diethylthioxanthone (available from Nippon Kayaku Co., Ltd.) (0.3 percent by mass), 4-methoxyphenol (available from Seiko Chemical Co., Ltd.) (0.1 percent by mass), and a silicone-based surfactant (product name: BYK-UV3510 available from Byk-Chemie Japan K.K.) (0.1 percent by mass) were added together in this order and stirred for 1 hour, and visual observation was performed to confirm that no material remained undissolved. Subsequently, the resultant was filtrated through a membrane filter to remove coarse particles that would be a cause of head clogging, to produce an active-energy-ray-curable ink 1.

(Active-Energy-Ray-Curable Ink Production Examples 2 to 12)
<Production of Active-Energy-Ray-Curable Inks 2 to 12>

Active-energy-ray-curable inks 2 to 12 were produced in the same manner as in Active-energy-ray-curable ink production example 1, except that the composition and contents used in Active-energy-ray-curable ink production example 1 were changed to the composition and contents presented in Tables 1-1 and 1-2 below.

N-vinylcaprolactam: available from Tokyo Chemical Industry Co., Ltd., SP value: 10.8 $(cal/cm^3)^{1/2}$, molar volume: 130.8 $cm^3/mol$ Benzyl acrylate: available from Osaka Organic Chemical Industry Ltd.

2-Phenoxyethyl acrylate: available from Osaka Organic Chemical Industry Ltd.

Isobornyl acrylate: available from Osaka Organic Chemical Industry Ltd.

Bis(2,4,6-trimethylbenzoyl)phenylphosphine oxide: available from BASF Japan Ltd.

2,4-Diethylthioxanthone: available from Nippon Kayaku Co., Ltd.

4-Methoxyphenol: available form Seiko Chemical Co., Ltd.

Silicone-based surfactant: available from Byk-Chemie Japan K.K., product name: BYK-UV3510

TABLE 1-1

| | | | Active-energy-ray-curable ink | | | | | |
|---|---|---|---|---|---|---|---|---|
| | | | 1 | 2 | 3 | 4 | 5 | 6 |
| Polymerizable compound | Acrylamide compound | Acryloylmorpholine (SP value: 11.2 $(cal/cm^3)^{1/2}$, molar volume: 118.5 $cm^3/mol$) | 70.0 | 50.0 | 30.0 | 50.0 | 50.0 | — |
| | N-vinyl compound | N-vinylcaprolactam (SP value: 10.8 $(cal/cm^3)^{1/2}$, molar volume: 130.8 $cm^3/mol$) | — | — | — | — | — | 70.0 |
| | | Benzyl acrylate | 24.0 | 44.0 | 64.0 | — | — | 24.0 |
| | | 2-phenoxyethyl acrylate | — | — | — | 44.0 | — | — |
| | | Isobornyl acrylate | — | — | — | — | 44.0 | — |
| Polymerization initiator | | Bis(2,4,6-trimethylbenzoyl)phenylphosphine oxide | 5.5 | 5.5 | 5.5 | 5.5 | 5.5 | 5.5 |
| | | 2,4-diethylthioxanthone | 0.3 | 0.3 | 0.3 | 0.3 | 0.3 | 0.3 |
| Polymerization inhibitor | | 4-methoxyphenol | 0.1 | 0.1 | 0.1 | 0.1 | 0.1 | 0.1 |
| Surfactant | | Silicone-based surfactant | 0.1 | 0.1 | 0.1 | 0.1 | 0.1 | 0.1 |
| | | Total (percent by mass) | 100.0 | 100.0 | 100.0 | 100.0 | 100.0 | 100.0 |

TABLE 1-2

| | | | Active-energy-ray-curable ink | | | | | |
|---|---|---|---|---|---|---|---|---|
| | | | 7 | 8 | 9 | 10 | 11 | 12 |
| Polymerizable compound | Acrylamide compound | Acryloylmorpholine (SP value: 11.2 $(cal/cm^3)^{1/2}$, molar volume: 118.5 $cm^3/mol$) | — | — | — | — | 30.0 | 15.0 |
| | N-vinyl compound | N-vinylcaprolactam (SP value: 10.8 $(cal/cm^3)^{1/2}$, molar volume 130.8 $cm^3/mol$) | 50.0 | 30.0 | 50.0 | 50.0 | 30.0 | 15.0 |
| | | Benzyl acrylate | 44.0 | 64.0 | — | — | — | — |
| | | 2-phenoxyethyl acrylate | — | — | 44.0 | — | 34.0 | 64.0 |
| | | Isobornyl acrylate | — | — | — | 44.0 | — | — |
| Polymerization initiator | | Bis(2,4,6-trimethylbenzoyl)phenylphosphine oxide | 5.5 | 5.5 | 5.5 | 5.5 | 5.5 | 5.5 |
| | | 2,4-diethylthioxanthone | 0.3 | 0.3 | 0.3 | 0.3 | 0.3 | 0.3 |
| Polymerization inhibitor | | 4-methoxyphenol | 0.1 | 0.1 | 0.1 | 0.1 | 0.1 | 0.1 |
| Surfactant | | Silicone-based surfactant | 0.1 | 0.1 | 0.1 | 0.1 | 0.1 | 0.1 |
| | | Total (percent by mass) | 100.0 | 100.0 | 100.0 | 100.0 | 100.0 | 100.0 |

Product names and supplier names of the components of Tables 1-1 and 1-2 are as follows.

Acryloylmorpholine: available from KJ Chemicals Corporation, SP value: 11.2 $(cal/cm^3)^{1/2}$, molar volume: 118.5 $cm^3/mol$ (Ink Discharging Head Production Example 1)
<Production of Ink Discharging Head 1>

A bisphenol A-type epoxy compound 1 (product name: JER828 available from Mitsubishi Chemical Corporation) (40.0 percent by mass), a bisphenol F-type epoxy compound (product name: JER806 available from Mitsubishi Chemical Corporation) (20.0 percent by mass), a p-aminophenol-type epoxy compound (product name: JER630 available from Mitsubishi Chemical Corporation) (20.0 percent by mass), and silica (product name: AEROSIL R972 available from Nippon Aerosil Co., Ltd.) (2.0 percent by mass) were added together in this order and stirred and mixed to a uniform state. An amine adduct (product name: AMICURE MY-24 available from Ajinomoto Fine-Techno Co. Inc.) (18.0 percent by mass) was further added, and the materials were stirred and mixed to a uniform state, to produce an epoxy adhesive 1. Using this epoxy adhesive 1, members to constitute liquid chambers, members to constitute a nozzle plate, and members to constitute a flow path, which were members to contact the active-energy-ray-curable ink, were joined, to produce an ink discharging head 1 (MH5440 available from Ricoh Company, Ltd.) including: liquid chambers; a nozzle plate including nozzle holes; and a flow path.

(Ink Discharging Head Production Examples 2 to 4)
<Production of Ink Discharging Heads 2 to 4>

Ink discharging heads 2 to 4 were produced in the same manner as in Ink discharging head production example 1, except that the composition and contents of the components of the epoxy adhesive used in Ink discharging head production example 1 were changed to as presented in Table 2 below. The content of epoxy group in the adhesive before cured, and the elastic modulus $E_1$ (initial value (GPa) before immersed) and Martens hardness $M_1$ (initial value (N/mm$^2$) before immersed) of a cured product of the adhesive are also presented in Table 2 below.

Amine adduct: available from Ajinomoto Fine-Techno Co. Inc. product name: AMICURE MY-24

Silica: available from Nippon Aerosil Co., Ltd., product name: AEROSIL R972

Example 1

The active-energy-ray curable ink 1 and the ink discharging head 1 that were produced were combined and incorporated in an image forming apparatus, to obtain an ink discharging apparatus 1.

Examples 2 to 20 and Comparative Examples 1 to 8

Ink discharging apparatuses 2 to 28 were obtained in the same manner as in Example 1, except that the active-energy-ray-curable ink 1 and the ink discharging head 1 used in Example 1 were changed to the active-energy-ray-curable inks and ink discharging heads presented in Table 3 below.

Next, using the obtained ink discharging apparatuses 1 to 28, "elastic modulus", "Martens hardness", and "discharging stability" were evaluated in the manners described below.

(Elastic Modulus and Martens Hardness)

Each of the epoxy adhesives 1 to 4 was poured into a mold and cured at 90 degrees C. for 4 hours, to obtain a cured product having an average thickness of 1 mm. The elastic modulus $E_1$ (initial value (GPa) before immersed) and Martens hardness $M_1$ (initial value (N/mm$^2$) before immersed) of the cured product are presented in Table 2. Next, using the

TABLE 2

| | | Epoxy equivalent (g/mol) | Epoxy adhesive | | | |
|---|---|---|---|---|---|---|
| | | | 1 | 2 | 3 | 4 |
| Epoxy compound | Bisphenol A-type epoxy compound 1 | 184-194 | 40.0 | — | — | — |
| | Bisphenol A-type epoxy compound 2 | 450-500 | — | 40.0 | 40.0 | — |
| | Bisphenol A-type epoxy compound 3 | 1,750-2,200 | — | — | — | 40.0 |
| | Bisphenol F-type epoxy compound | 160-170 | 20.0 | 20.0 | 40.0 | 40.0 |
| | p-aminophenol-type epoxy compound | 90-105 | 20.0 | 20.0 | — | — |
| Curing agent | Amine adduct | | 18.0 | 18.0 | 18.0 | 18.0 |
| Filler | Silica | | 2.0 | 2.0 | 2.0 | 2.0 |
| | Total (percent by mass) | | 100.0 | 100.0 | 100.0 | 100.0 |
| | Content of epoxy group (mol/100 g) | | 0.54 | 0.41 | 0.33 | 0.26 |
| | Elastic modulus $E_1$ of cured product (initial value before immersed) (GPa) | | 4.3 | 4.0 | 3.5 | 3.2 |
| | Martens hardness $M_1$ of cured product (initial value before immersed) (N/mm$^2$) | | 240 | 200 | 180 | 165 |

Product names and supplier names of the components of Table 2 are as follows.

Bisphenol A-type epoxy compound 1: available from Mitsubishi Chemical Corporation, product name: JER828

Bisphenol A-type epoxy compound 2: available from Mitsubishi Chemical Corporation, product name: JER1001

Bisphenol A-type epoxy compound 3: available from Mitsubishi Chemical Corporation, product name: JER 1007

Bisphenol F-type epoxy compound: available from Mitsubishi Chemical Corporation, product name: JER806 p-Aminophenol-type epoxy compound: available from Mitsubishi Chemical Corporation, product name: JER630 combinations of inks and epoxy adhesives presented in Table 3 below, each of the obtained cured products was put in a glass-made light-shading bottle filled with the active-energy-ray-curable ink (50 mL), and the bottle was hermetically sealed. Subsequently, the cured product was immersed in the ink in the bottle for 4 weeks at GO degrees C. in a hot-air oven, to obtain an immersed product. The elastic modulus $E_2$ (GPa) and Martens hardness $M_2$ (N/mm$^2$) of the immersed product were measured in the same manners as measuring the elastic modulus $E_1$ and Martens hardness $M_1$ of the cured product before immersed, and decreasing rates of the elastic modulus $E_2$ (GPa) and Martens hardness $M_2$ (N/mm$^2$) of the immersed product to the elastic modulus $E_1$ (GPa) and Martens hardness $M_1$ (N/mm$^2$) of the cured product before immersed were calculated according to a formula (1) below and a formula (2) below. The results are presented in Table 3.

(product name: JER806 available from Mitsubishi Chemical Corporation) (20.0 percent by mass), a p-aminophenol-type Elastic modulus decreasing rate (%)={$(E_1-E_2)/E_1$}×100     formula (1)

Martens hardness decreasing rate (%)={$(M_1-M_2)/M_1$}×100     formula (2)

From the viewpoint of ease of evaluation, the elastic modulus and Marten hardness were evaluated using the epoxy adhesives instead of the ink discharging apparatuses. However, the results of evaluation using the epoxy adhesives are the same as the results of evaluation using the ink discharging apparatuses.

(Discharging Stability)

The discharging conditions of the obtained ink discharging apparatuses were set such that the ink liquid droplet discharging speed would be 7 m/s. The ink was left to stand for 4 weeks in a state of being filled in the ink discharging head, and then discharged again under the discharging conditions set, to evaluate "discharging stability" according to evaluation criteria described below.

[Evaluation Criteria]

A: The discharging speed after the ink was left to stand was 6 m/s or higher.

B: The discharging speed after the ink was left to stand was 5 m/s or higher but lower than 6 m/s.

C: The discharging speed after the ink was left to stand was lower than 5 m/s, or the ink was not discharged.

this, in the ink discharging apparatuses of Comparative Examples 1 to 8, the decreasing rates of the elastic modulus and Martens hardness after immersed in the active-energy-ray-curable ink to the elastic modulus and Marten hardness before immersed were greater than 50 percent, swelling of the adhesives was large, and the ink discharging apparatuses failed in discharging stability.

Aspects of the present disclosure are as follows, for example.

<1> An ink discharging apparatus including:
an active-energy-ray-curable ink; and
an ink discharging head,
the ink discharging head including:
   liquid chambers;
   a nozzle plate including nozzle holes; and
   a flow path,
members of the ink discharging head to contact the active-energy-ray-curable ink being joined using an epoxy adhesive, the ink discharging head being configured to discharge the active-energy-ray-curable ink from the nozzle holes,
wherein the active-energy-ray-curable ink contains at least any one selected from the group consisting of an acrylamide compound and an N-vinyl compound, and
wherein an elastic modulus decreasing rate represented by a formula (1) below is 50 percent or less, Elastic modulus decreasing rate (%)={$(E_1-E_2)/E_1$}×100     formula (1)

TABLE 3

|  |  | Ink No. | Ink discharging head | | Evaluation result | | |
|---|---|---|---|---|---|---|---|
|  |  |  | Head No. | Epoxy adhesive | Elastic modulus decreasing rate (%) | Martens hardness decreasing rate (%) | Discharging stability |
| Ex. | 1 | 1 | 1 | 1 | 10 | 9 | A |
|  | 2 | 2 | 1 | 1 | 8 | 5 | A |
|  | 3 | 3 | 1 | 1 | 4 | 8 | A |
|  | 4 | 4 | 1 | 1 | 8 | 7 | A |
|  | 5 | 5 | 1 | 1 | 5 | 9 | A |
|  | 6 | 6 | 1 | 1 | 6 | 8 | A |
|  | 7 | 7 | 1 | 1 | 6 | 3 | A |
|  | 8 | 8 | 1 | 1 | 2 | 2 | A |
|  | 9 | 9 | 1 | 1 | 4 | 5 | A |
|  | 10 | 10 | 1 | 1 | 2 | 1 | A |
|  | 11 | 11 | 1 | 1 | 8 | 8 | A |
|  | 12 | 12 | 1 | 1 | 5 | 4 | A |
|  | 13 | 1 | 2 | 2 | 35 | 27 | B |
|  | 14 | 3 | 2 | 2 | 9 | 10 | A |
|  | 15 | 5 | 2 | 2 | 17 | 15 | B |
|  | 16 | 6 | 2 | 2 | 23 | 17 | B |
|  | 17 | 8 | 2 | 2 | 6 | 9 | A |
|  | 18 | 10 | 2 | 2 | 7 | 5 | A |
|  | 19 | 3 | 3 | 3 | 47 | 42 | B |
|  | 20 | 8 | 3 | 3 | 37 | 48 | B |
| Comp. Ex. | 1 | 1 | 3 | 3 | 70 | 60 | C |
|  | 2 | 6 | 3 | 3 | 55 | 59 | C |
|  | 3 | 11 | 3 | 3 | 63 | 59 | C |
|  | 4 | 1 | 4 | 4 | 95 | 92 | C |
|  | 5 | 3 | 4 | 4 | 79 | 86 | C |
|  | 6 | 6 | 4 | 4 | 83 | 79 | C |
|  | 7 | 8 | 4 | 4 | 66 | 57 | C |
|  | 8 | 11 | 4 | 4 | 82 | 74 | C |

It is seen that in the ink discharging apparatuses of Examples 1 to 20, the decreasing rates of the elastic modulus and Martens hardness after immersed in the active-energy-ray-curable ink to the elastic modulus and Martens hardness before immersed were 50 percent or less, swelling of the adhesives was small, and discharging stability of the ink discharging apparatuses was excellent. As compared with where $E_1$ represents an elastic modulus (GPa) of a cured product obtained by curing the epoxy adhesive at 90 degrees C. for 4 hours, and $E_2$ represents an elastic modulus (GPa) of an immersed product obtained by immersing the cured product in the active-energy-ray-curable ink at 60 degrees C. for 4 weeks.

<2> The ink discharging apparatus according to <1>,
wherein the acrylamide compound is acryloylmorpholine, and
wherein the N-vinyl compound is N-vinylcaprolactam.
<3> The ink discharging apparatus according to <1> or <2>,
wherein the elastic modulus decreasing rate of the cured product is 10 percent or less.
<4> The ink discharging apparatus according to any one of <1> to <3>,
wherein the elastic modulus $E_1$ of the cured product is 3.5 GPa or greater.
<5> An ink discharging apparatus including:
an active-energy-ray-curable ink; and
an ink discharging head,
the ink discharging head including:
    liquid chambers;
    a nozzle plate including nozzle holes; and
    a flow path,
members of the ink discharging head to contact the active-energy-ray-curable ink being joined using an epoxy adhesive, the ink discharging head being configured to discharge the active-energy-ray-curable ink from the nozzle holes,
wherein the active-energy-ray-curable ink contains at least any one selected from the group consisting of an acrylamide compound and an N-vinyl compound, and
wherein a Martens hardness decreasing rate represented by a formula (2) below is 50 percent or less, $$\text{Martens hardness decreasing rate (\%)} = \{(M_1 - M_2)/M_1\} \times 100 \quad \text{formula (2)}$$

where $M_1$ represents a Martens hardness (N/mm$^2$) of a cured product obtained by curing the epoxy adhesive at 90 degrees C. for 4 hours, and $M_2$ represents a Martens hardness (N/mm$^2$) of an immersed product obtained by immersing the cured product in the active-energy-ray-curable ink at 60 degrees C. for 4 weeks.
<6> The ink discharging apparatus according to <5>,
wherein the acrylamide compound is acryloylmorpholine, and
wherein the N-vinyl compound is N-vinylcaprolactam.
<7> The ink discharging apparatus according to <5> or <6>,
wherein the Martens hardness decreasing rate of the cured product is 10 percent or less.
<8> The ink discharging apparatus according to any one of <5> to <7>,
wherein the Martens hardness $M_1$ of the cured product is 180 N/mm$^2$ or greater.
<9> The ink discharging apparatus according to any one of <1> to <8>,
wherein a content of epoxy group in the epoxy adhesive before cured is 0.4 mol/100 g or greater.
<10> The ink discharging apparatus according to any one of <1> to <9>,
wherein a total of contents of the acrylamide compound and the N-vinyl compound is 30 percent by mass or greater of a total amount of the active-energy-ray-curable ink.
<11> The ink discharging apparatus according to any one of <1> to <10>,
wherein the members that are to contact the active-energy-ray-curable ink and are joined using the epoxy adhesive include at least any one selected from the group consisting of the nozzle plate, a flow path plate, and a vibration plate.
<12> The ink discharging apparatus according to any one of <1> to <11>, wherein the epoxy adhesive contains an epoxy compound and a curing agent.
<13> The ink discharging apparatus according to any one of <1> to <12>,
wherein a content of epoxy group in the epoxy adhesive before cured is 0.5 mol/100 g or greater.
<14> The ink discharging apparatus according to <12> or <13>,
wherein the epoxy compound is at least any one of a bisphenol A-type epoxy compound and a bisphenol F-type epoxy compound.
<15> The ink discharging apparatus according to any one of <12> to <14>,
wherein the curing agent is an amine-based compound.
<16> The ink discharging apparatus according to any one of <1> to <15>,
wherein a viscosity of the active-energy-ray-curable ink at 25 degrees C. is 3 mPa·s or greater but 40 mPa·s or less.
<17> The ink discharging apparatus according to any one of <1> to <16>,
wherein the active-energy-ray-curable ink further contains a polymerization initiator.
<18> The ink discharging apparatus according to any one of <1> to <17>,
wherein the active-energy-ray-curable ink further contains a polymerization inhibitor.
<19> The ink discharging apparatus according to any one of <12> to <18>,
wherein a content of the curing agent is 1 percent by mass or greater but 30 percent by mass or less of a total amount of the epoxy adhesive.
<20> An ink discharging method including
forming an image using the ink discharging apparatus according to any one of <1> to <19>.
<21> The ink discharging method according to <20>,
wherein the image is a three-dimensional image.
<22> The ink discharging method according to <20> or <21>,
wherein a viscosity of the active-energy-ray-curable ink at 25 degrees C. is 3 mPa·s or greater but 40 mPa·s or less.

The ink discharging apparatus according to any one of <1> to <19> and the ink discharging method according to any one of <20> to <22> can solve the various problems in the related art and can achieve the object of the present disclosure.

What is claimed is:
1. An ink discharging apparatus comprising:
an active-energy-ray-curable ink; and
an ink discharging head,
wherein the ink discharging head comprises:
    liquid chambers;
    a nozzle plate that comprises nozzle holes; and
    a flow path,
wherein members of the ink discharging head to contact the active-energy-ray-curable ink are joined using an epoxy adhesive,
wherein the ink discharging head is configured to discharge the active-energy-ray-curable ink from the nozzle holes,
wherein the active-energy-ray-curable ink comprises at least any one selected from the group consisting of an acrylamide compound and an N-vinyl compound, and wherein an elastic modulus decreasing rate represented by a formula (1) below is 50 percent or less, Elastic modulus decreasing rate (%)=$\{(E_1-E_2)/E_1\}\times 100$   formula (1)

where $E_1$ represents an elastic modulus (GPa) of a cured product obtained by curing the epoxy adhesive at 90 degrees C. for 4 hours, and $E_2$ represents an elastic modulus (GPa) of an immersed product obtained by immersing the cured product in the active-energy-ray-curable ink at 60 degrees C. for 4 weeks.

2. The ink discharging apparatus according to claim 1, wherein the acrylamide compound comprises acryloylmorpholine, and
wherein the N-vinyl compound comprises N-vinylcaprolactam.

3. The ink discharging apparatus according to claim 1, wherein the elastic modulus decreasing rate of the cured product is 10 percent or less.

4. The ink discharging apparatus according to claim 1, wherein a content of epoxy group in the epoxy adhesive before cured is 0.4 mol/100 g or greater.

5. The ink discharging apparatus according to claim 1, wherein a total of contents of the acrylamide compound and the N-vinyl compound is 30 percent by mass or greater of a total amount of the active-energy-ray-curable ink.

6. The ink discharging apparatus according to claim 1, wherein the members that are to contact the active-energy-ray-curable ink and are joined using the epoxy adhesive comprise at least any one selected from the group consisting of the nozzle plate, a flow path plate, and a vibration plate.

7. An ink discharging apparatus comprising:
an active-energy-ray-curable ink; and
an ink discharging head,
wherein the ink discharging head comprises:
 liquid chambers;
 a nozzle plate that comprises nozzle holes; and
 a flow path,
wherein members of the ink discharging head to contact the active-energy-ray-curable ink are joined using an epoxy adhesive,
wherein the ink discharging head is configured to discharge the active-energy-ray-curable ink from the nozzle holes,
wherein the active-energy-ray-curable ink comprises at least any one selected from the group consisting of an acrylamide compound and an N-vinyl compound, and
wherein a Martens hardness decreasing rate represented by a formula (2) below is 50 percent or less, Martens hardness decreasing rate (%)= $\{(M_1-M_2)/M_1\}\times 100$   formula (2)

where $M_1$ represents a Martens hardness (N/mm²) of a cured product obtained by curing the epoxy adhesive at 90 degrees C. for 4 hours, and $M_2$ represents a Martens hardness (N/mm²) of an immersed product obtained by immersing the cured product in the active-energy-ray-curable ink at 60 degrees C. for 4 weeks.

8. The ink discharging apparatus according to claim 7, wherein the acrylamide compound comprises acryloylmorpholine, and
wherein the N-vinyl compound comprises N-vinylcaprolactam.

9. The ink discharging apparatus according to claim 7, wherein the Martens hardness decreasing rate of the cured product is 10 percent or less.

10. An ink discharging method comprising
forming an image using an ink discharging apparatus that comprises:
an active-energy-ray-curable ink; and
an ink discharging head,
wherein the ink discharging head comprises:
 liquid chambers;
 a nozzle plate that comprises nozzle holes; and
 a flow path,
wherein members of the ink discharging head to contact the active-energy-ray-curable ink are joined using an epoxy adhesive,
wherein the ink discharging head is configured to discharge the active-energy-ray-curable ink from the nozzle holes,
wherein the active-energy-ray-curable ink comprises at least any one selected from the group consisting of an acrylamide compound and an N-vinyl compound, and
wherein an elastic modulus decreasing rate represented by a formula (1) below is 50 percent or less, Elastic modulus decreasing rate (%)=$\{(E_1-E_2)/E_1\}\times 100$   formula (1)

where $E_1$ represents an elastic modulus (GPa) of a cured product obtained by curing the epoxy adhesive at 90 degrees C. for 4 hours, and $E_2$ represents an elastic modulus (GPa) of an immersed product obtained by immersing the cured product in the active-energy-ray-curable ink at 60 degrees C. for 4 weeks.

11. The ink discharging method according to claim 10, wherein the acrylamide compound comprises acryloylmorpholine, and
wherein the N-vinyl compound comprises N-vinylcaprolactam.

12. The ink discharging method according to claim 10, wherein the elastic modulus decreasing rate of the cured product is 10 percent or less.

13. The ink discharging method according to claim 10, wherein a content of epoxy group in the epoxy adhesive before cured is 0.4 mol/100 g or greater.

14. The ink discharging method according to claim 10, wherein a total of contents of the acrylamide compound and the N-vinyl compound is 30 percent by mass or greater of a total amount of the active-energy-ray-curable ink.

15. The ink discharging method according to claim 10, wherein the members that are to contact the active-energy-ray-curable ink and are joined using the epoxy adhesive comprise at least any one selected from the group consisting of the nozzle plate, a flow path plate, and a vibration plate.

* * * * *